United States Patent
Basu et al.

(10) Patent No.: US 7,698,310 B2
(45) Date of Patent: Apr. 13, 2010

(54) SYSTEM FOR ALLOWING OBJECT METADATA TO BE SHARED BETWEEN CURSORS FOR CONCURRENT READ WRITE ACCESS

(75) Inventors: Subhransu Basu, Fremont, CA (US); Russell John Green, San Carlos, CA (US); Shrikanth Shankar, Mountain View, CA (US)

(73) Assignee: Oracle International Corporation, Redwood Shores, CA (US)

(*) Notice: Subject to any disclaimer, the term of this patent is extended or adjusted under 35 U.S.C. 154(b) by 612 days.

(21) Appl. No.: 11/129,617

(22) Filed: May 13, 2005

(65) Prior Publication Data

US 2006/0004755 A1 Jan. 5, 2006

Related U.S. Application Data

(60) Provisional application No. 60/571,362, filed on May 14, 2004.

(51) Int. Cl.
*G06F 17/30* (2006.01)

(52) U.S. Cl. ............... 707/203; 707/1; 707/8; 707/100; 707/200; 707/201

(58) Field of Classification Search ........... 707/203, 707/8, 100, 200, 201, 1
See application file for complete search history.

(56) References Cited

U.S. PATENT DOCUMENTS

| 5,325,523 | A | 6/1994 | Beglin et al. |
| 6,112,024 | A * | 8/2000 | Almond et al. ............. 717/122 |
| 6,226,788 | B1 | 5/2001 | Schoening et al. |
| 6,289,358 | B1 | 9/2001 | Mattis et al. |
| 6,366,917 | B1 | 4/2002 | St. John Herbert, III |
| 6,502,108 | B1 * | 12/2002 | Day et al. ................... 707/203 |
| 6,564,263 | B1 | 5/2003 | Bergman et al. |
| 6,584,476 | B1 | 6/2003 | Chatterjee et al. |
| 6,718,436 | B2 * | 4/2004 | Kim et al. ................... 711/114 |
| 6,839,724 | B2 | 1/2005 | Manchanda et al. |
| 6,915,313 | B2 | 7/2005 | Yao |
| 7,028,057 | B1 | 4/2006 | Vasudevan et al. |
| 7,092,972 | B2 | 8/2006 | Kashyap |
| 7,130,957 | B2 | 10/2006 | Rao |
| 7,174,372 | B1 | 2/2007 | Sarkar |
| 7,203,709 | B2 | 4/2007 | Long et al. |
| 2003/0069902 | A1 | 4/2003 | Narang et al. |

(Continued)

OTHER PUBLICATIONS

Office Action dated Aug. 9, 2007 for U.S. Appl. No. 11/129,717.

(Continued)

*Primary Examiner*—Cam-Linh Nguyen
(74) *Attorney, Agent, or Firm*—Vista IP Law Group, LLP.

(57) ABSTRACT

A system, method, computer program and article of manufacture for sharing metadata among cursors is provided. A metadata object marked as a versioned object can have multiple versions. Program units can share these versions of object metadata as opposed to copying the non-versioned object metadata into their memory. These program units may contain a pointer to an object's metadata but are otherwise void of the metadata information for the object. A locking protocol for the metadata ensures concurrency control and triggers dependency tracking. A locking protocol for the cursors controls cursor dependency status.

21 Claims, 10 Drawing Sheets

U.S. PATENT DOCUMENTS

| | | |
|---|---|---|
| 2003/0110175 A1 | 6/2003 | Yao |
| 2003/0120868 A1 | 6/2003 | Royer et al. |
| 2003/0195866 A1* | 10/2003 | Long et al. .................. 707/1 |
| 2003/0212717 A1 | 11/2003 | Kashvap |
| 2004/0107183 A1 | 6/2004 | Mangan |
| 2004/0210582 A1 | 10/2004 | Chatterjee et al. |
| 2004/0210607 A1 | 10/2004 | Manchanda et al. |
| 2005/0125461 A1 | 6/2005 | Filz |
| 2005/0149583 A1 | 7/2005 | Baskaran et al. |
| 2006/0020620 A1 | 1/2006 | Iyer et al. |
| 2006/0190500 A1 | 8/2006 | Rao et al. |
| 2006/0253497 A1 | 11/2006 | Abali et al. |
| 2006/0259518 A1 | 11/2006 | Lomet et al. |
| 2007/0050366 A1 | 3/2007 | Bugir et al. |
| 2007/0050382 A1 | 3/2007 | Bugir et al. |
| 2007/0162486 A1 | 7/2007 | Brueggemann et al. |
| 2008/0005184 A1 | 1/2008 | Myllyla et al. |

OTHER PUBLICATIONS

Office Action Dated Apr. 17, 2008 for U.S. Appl. No. 11/129,717.
Office Action Dated Oct. 2, 2008 for U.S. Appl. No. 11/129,717.
U.S. Appl. No. 11/129,717, filed Oct. 6, 2009, Non-Final Office Action.

* cited by examiner

SYSTEM FOR ALLOWING OBJECT METADATA TO BE SHARED BETWEEN CURSORS FOR CONCURRENT READ WRITE ACCESS

CROSS REFERENCED AND RELATED APPLICATIONS

This application claims the benefit of U.S. Provisional Application Ser. No. 60/571,362 filed on May 14, 2004 and is related to U.S. application Ser. No. 11/129,717 filed on even date herewith entitled "System for Managing Versions of Cached Metadata," which claims the benefit of U.S. Provisional Application Ser. No. 60/571,361, filed on May 14, 2004. These applications are hereby incorporated by reference in their entireties as if fully set forth herein.

BACKGROUND AND SUMMARY

This invention related to computer systems, and more particularly to sharing metadata between program units.

A system global cache can serve as a global repository of cached metadata for objects. As requests from clients are received, each request is converted through compilation into a program unit, or cursor. The program unit stores the information needed to execute, including the metadata for the object being acted upon. If the object being accessed is partitioned, the metadata contains information about each partition. The memory needs of the metadata for a partitioned object is proportional in size to the number of object partitions. Therefore, as the number of partitions increases, the metadata storage requirements for the cursor program unit increases. Program unit memory usage can become significant in a system with partitioned objects having a large number of partitions or is a system that receives a large number of requests which access partitioned objects. Significant program unit memory usage can impact scalability.

A system, method, computer program, and article of manufacture for sharing metadata among program units is provided. A metadata object marked as a versioned object can have multiple versions. Program units can share these versions of object metadata as opposed to copying the non-versioned object metadata into their memory. These program units may contain a pointer to an object's metadata but are otherwise void of the metadata information for the object. A locking protocol for the metadata ensures concurrency control and triggers dependency tracking. A locking protocol for the program unit controls cursor dependency status.

A method of sharing metadata can include: receiving a plurality of requests to access a resource, creating a program unit for each of the plurality of requests, creating an execution representation of the metadata object of the resource, and sharing the execution representation of the metadata among the plurality of program units.

DETAILED DESCRIPTION

The present invention is directed to a method and system for allowing object metadata to be shared between program units for concurrent read write access. In the following description, for the purposes of explanation, one or more embodiments having specific combinations of elements are set forth in order to provide a thorough description. It will be apparent, however, to one skilled in the art that the embodiments may be practiced without these specific combination of elements.

Versioned data allows a new version of data to be created as needed for execution of an intended operation. One type of data where versions can be beneficial is metadata. For, example, when a request to access a resource is issued, the database system converts the request through compilation into a program unit, or cursor. The program unit stores the information needed to execute, including the metadata for the object being acted upon. If the object being accessed is partitioned, the metadata contains information about each partition. The memory needs of the metadata for a partitioned object is proportional in size to the number of object partitions. As the number of partitions increases, the metadata storage requirement for a program unit increases. Consequently, program unit memory usage can become significant, inhibiting scalability. Program unit use of non-versioned metadata is illustrated in FIG. 1.

Figure 1:
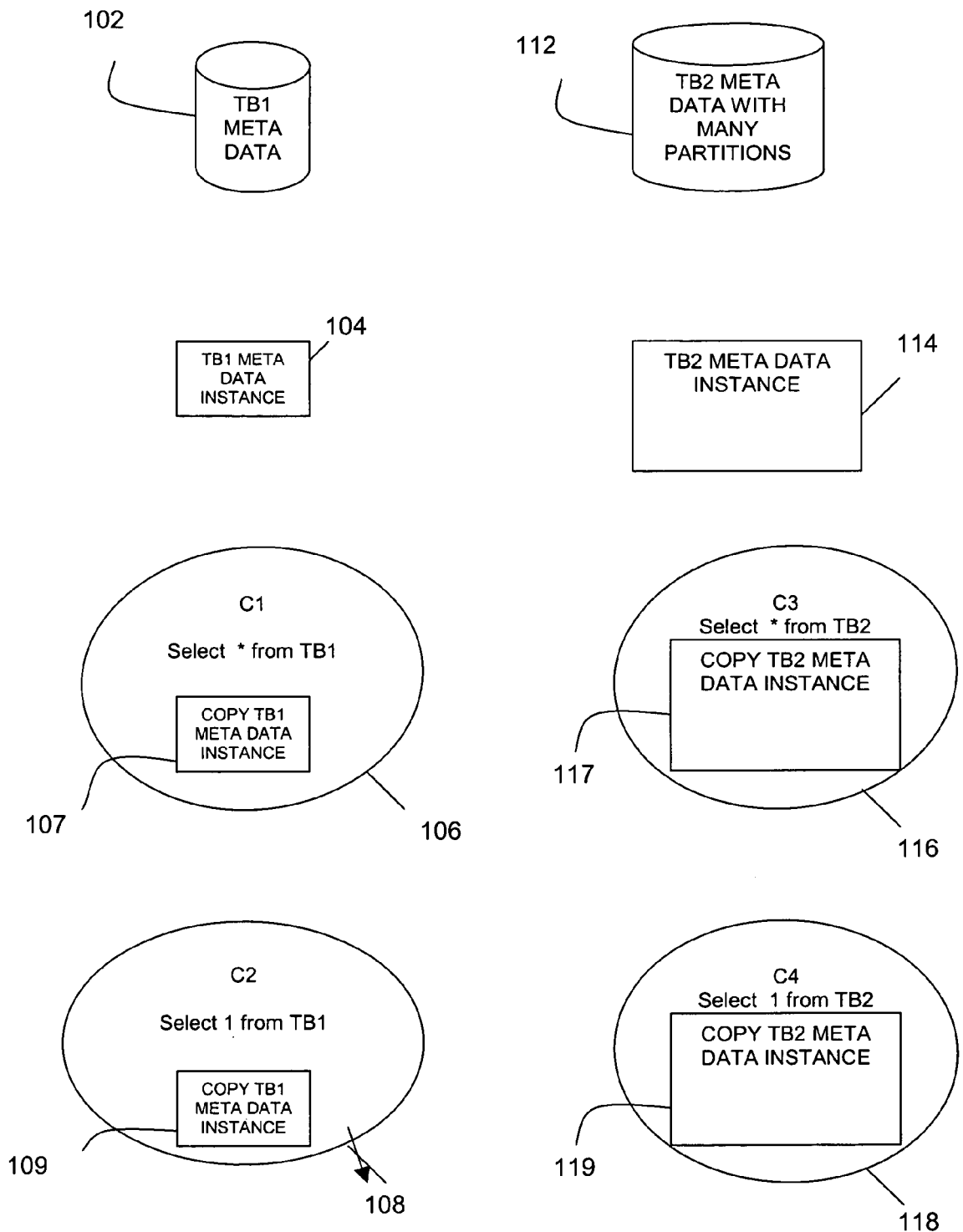
FIG. 1 is a representation of cursor use of non-versioned metadata for a system with few partitions and a system with many partitions.

FIG. 1 is an example representation of a non-versioned metadata object. The base metadata TB1 102 is stored as a non-versioned object. As a program unit is built, the base metadata is converted to a more readily executable form and stored in memory as TB1 metadata instance 104. TB1 is an object with a small number of partitions. Consequently, TB1 metadata 102 and TB1 metadata instance 104 occupy a small memory footprint. Each program unit that needs access to TB1 copies the metadata instance into the program unit memory. Cursor C1 106 contains a copy of metadata TB1 instance 107 and cursor C2 108 contains a copy of TB1 metadata instance 109. The disadvantage of this environment is evident in the remaining elements of FIG. 1.

Object TB2 in FIG. 1 is an object with a large number of partitions. As before, the base metadata is converted to a more readily executable form and stored in memory as TB2 metadata instance 114. Cursor C3 116 copies one metadata TB2 instance 117 and cursor C4 118 copies another metadata TB2 instance 119. Notice that TB2 metadata instance is much larger that TB1 metadata instance. This variation in size is due to the metadata required for each partition in object TB2. Each cursor that needs access to TB2 copies the metadata instance into the cursor memory. However, the metadata for an object with many partitions consumes more memory than the metadata for an object with few or no partitions. As a result the cursor memory requirement must continue to increase as the number of partitions increase. This presents a situation which is not conducive to scaling.

Figure 2:
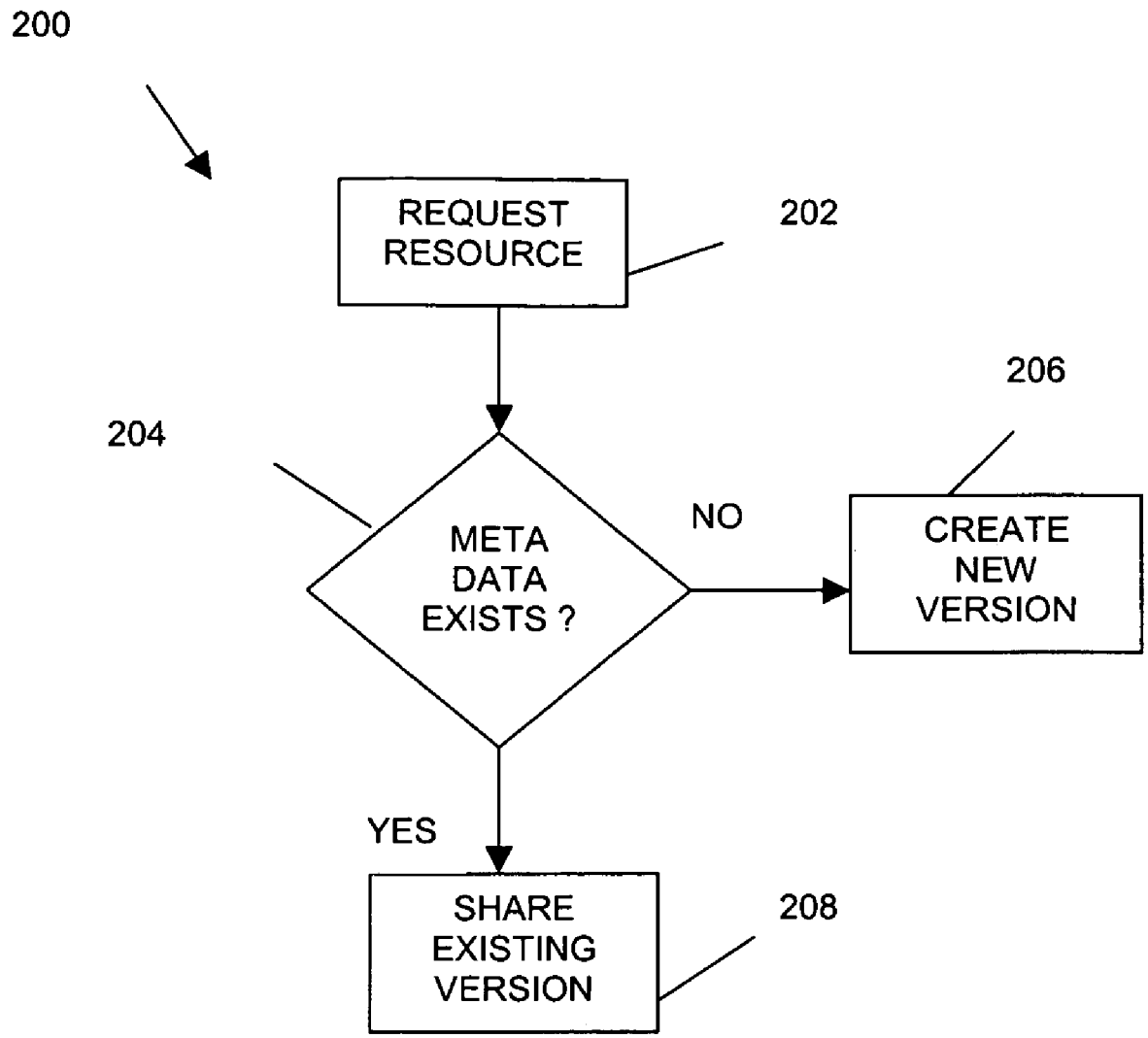
FIG. 2 is a representation of the process of sharing metadata.

To solve the scaling issue with metadata memory usage, in one embodiment, a metadata object is marked as a versioned object, i.e., capable of having many versions. As each request is compiled, the resulting program units share the metadata by linking to the most recent metadata execution representation version instead of copying the metadata into the program unit memory. Metadata sharing process 200 is illustrated in FIG. 2. At process action (202) a resource is requested. Instead of copying the metadata for the resource into the program unit memory, process action (204) searches for the metadata, and process action (206) determines if an execution representation version exists. If a metadata execution representation version exists for the requested object, the program unit shares this metadata execution representation with those program units already linked in process action (208). If the requested metadata does not have an execution representation, then an execution representation version is created in process action (210). This version would then be available to share with future program units or other objects. The search (204) and create (210) process actions are executed by the versioning infrastructure described below in the VERSIONING INFRASTRUCTURE section of the specification. A depiction of program unit sharing of versioned metadata is illustrated in FIGS. 3A and 3B.

Figure 3A:
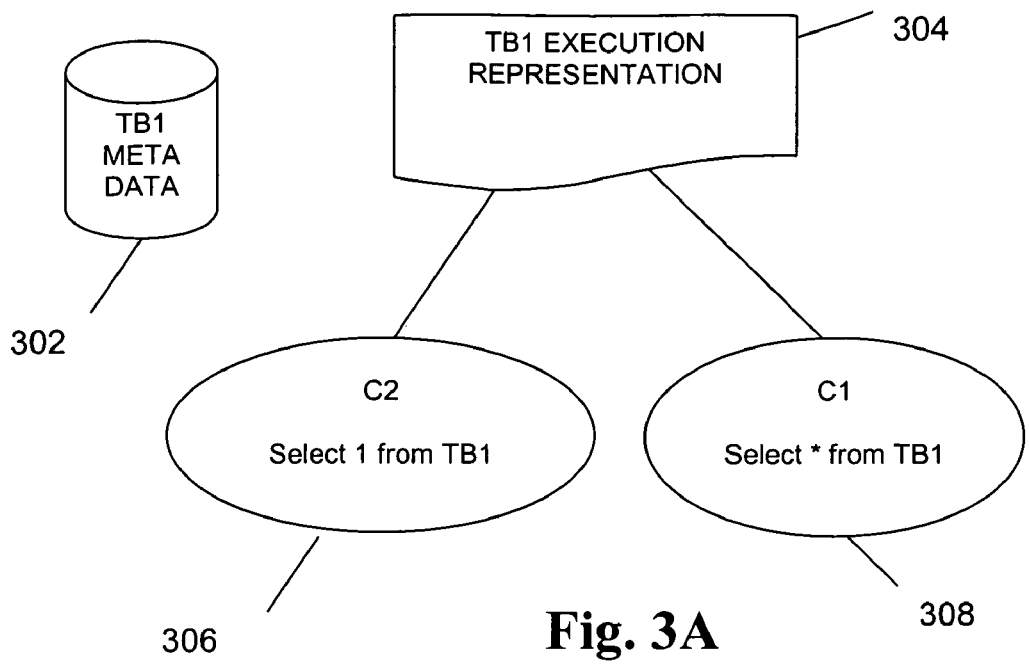
FIG. 3A is a representation of cursor sharing.
Figure 3B:
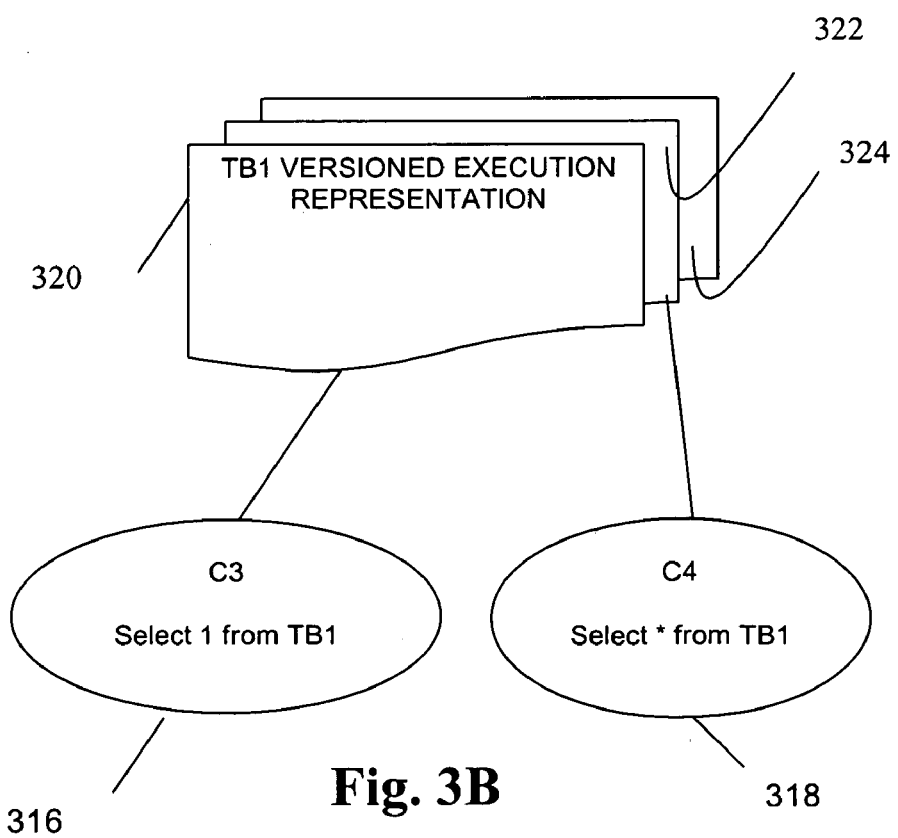
FIG. 3B is a representation of cursor sharing of versioned metadata.

FIG. 3A is an example representation of metadata sharing. Here, when a program unit requests access to base metadata TB1 302, TB1 execution representation is created. Both program units C1 306 and C2 308 do not copy the metadata version into their execution memory, but share the single execution representation version of TB1 metadata 304 by linking to it.

This program unit now exists which contains no metadata information regarding the objects on which it will act. The cursor may contain information regarding the intended operation and the location of, or pointers to, the metadata, but no actual metadata information for the object.

Using the memory environment depicted in FIG. 3A, an object could not be modified until all the cursors accessing the metadata of the object were finished executing. For example, when a program unit accesses an object, a lock can be placed on the metadata for that object. This lock prevents any changes to the object, and consequently, prevents any changes to the metadata because mid-execution changes may cause the program unit to fail or may invalidate the result. Changes to the metadata are blocked so that the program unit can execute the desired operation without mid-execution changes from other program units. This means that long running program units may lock the metadata for a long period of time, potentially blocking object changes that cause metadata updates even if those updates are known to have no affect on the executing program unit. To provide a mechanism to allow resource and metadata changes, the metadata object can be a versioned object.

FIG. 3B is a representation of versioned sharable metadata. The base metadata TB1 is stored as a versioned object. A plurality of execution representation versions of TB1 metadata can be created as illustrated by elements 320, 322, and 324. Each of the plurality of metadata execution representation versions can have linked program units, such as cursors. In another embodiment, nested linking is available (i.e., cursors may have other objects, metadata or cursors, link to them while they are linked to a metadata object). Note that although cursors are shown as ovals, and metadata as rectangles, a cursor is an example of metadata, and therefore, may be shown as the same entity type.

Using versioned metadata as depicted in FIG. 3B, a client may modify TB1 because the existing program units will remain linked to the execution representation version of metadata TB1 that they were sharing, while any new requests will share a newly built execution representation version of TB1 metadata. When a new execution representation version of metadata is created the previous execution representation version of metadata is marked obsolete. Obsolete execution representation versions of metadata will remain in the system while any cursor that depends on it, or expressed interest in it, still exists.

Figure 4:
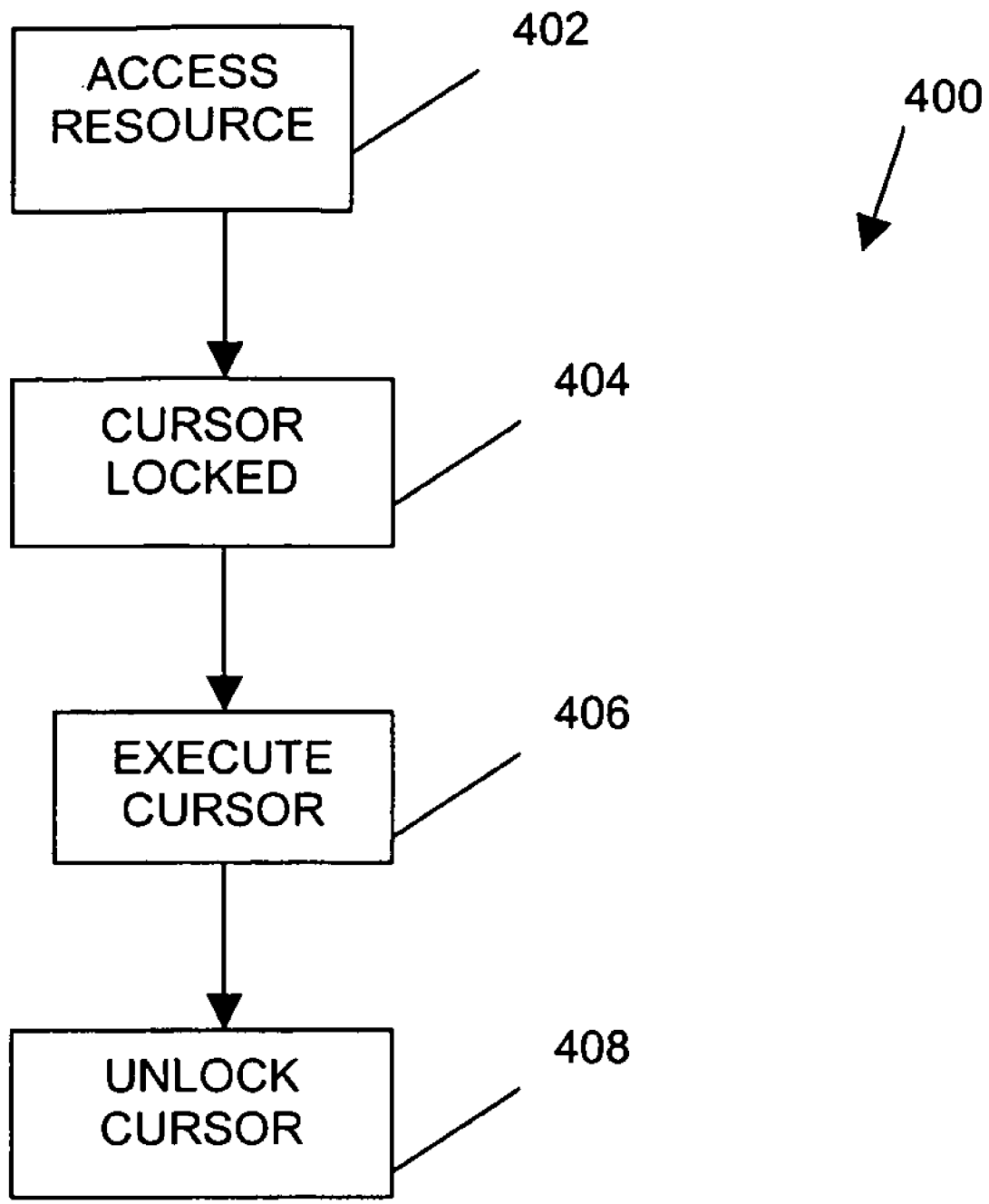
FIG. 4 is a representation of cursor operations.

As explained above, metadata can be locked. Since cursors are examples of metadata, cursors can also be locked. FIG. 4 illustrates the cursor locking process 400. When a resource is accessed (402) the cursor shares the resource and becomes locked (404). It remains locked while it is executing its intended operation during process action (406). Upon finishing execution, the cursor is unlocked and becomes a freeable dependent at process action (408).

Metadata Locking Protocol

Figure 5:
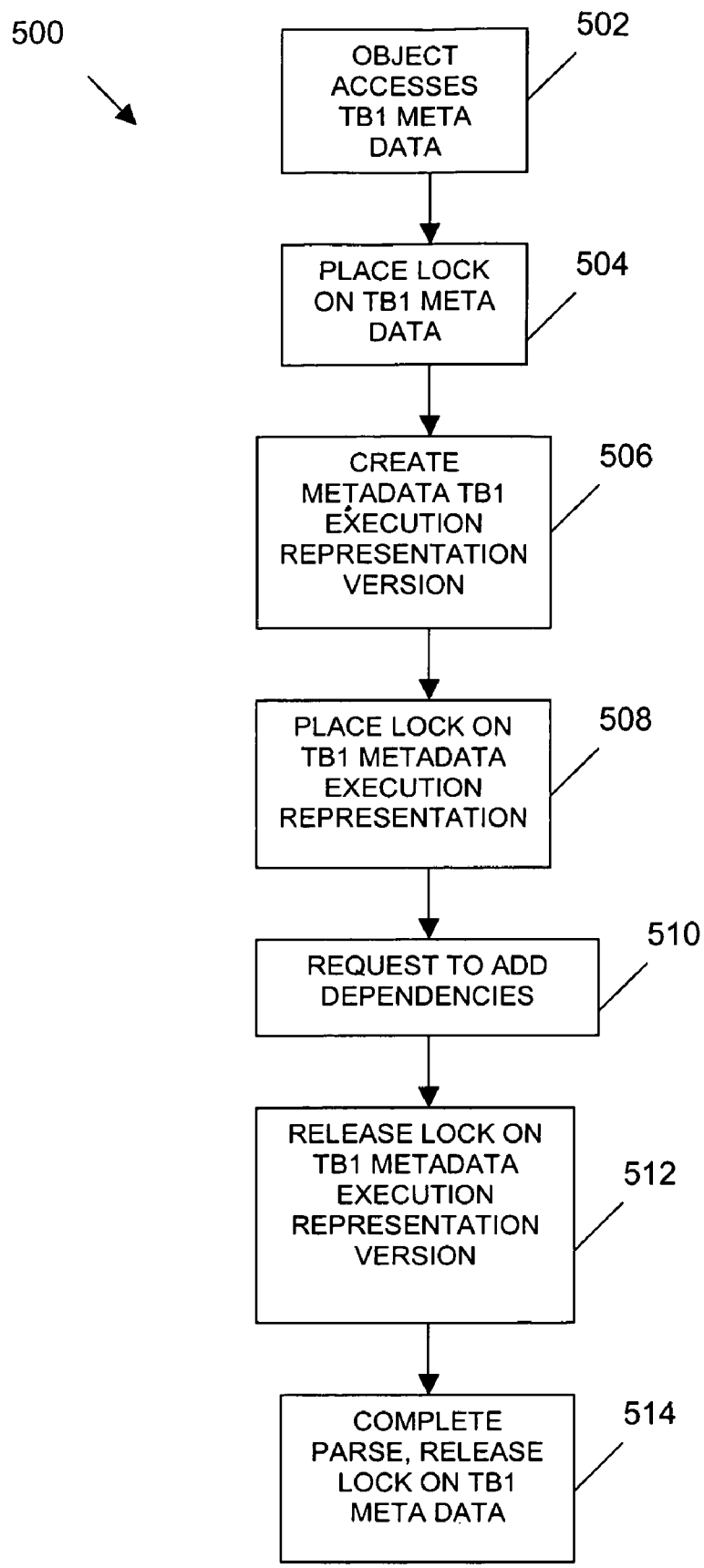
FIG. 5 is a representation of the versioned metadata locking protocol.

In another embodiment, a metadata locking protocol ensures concurrency control. FIG. 5 depicts the metadata locking protocol 500. The locking protocol 500 treats TB1 and any execution representation versions as one object where locking is concerned. This helps maintain concurrency control by preventing edits to the base metadata while another cursor is parsing. When a cursor accesses TB1 metadata (502), a lock is placed (504) on the base object, or persistent TB1 metadata. An execution representation version of TB1 metadata is created in process action (506). A lock is placed on the execution representation version metadata in process action (508). At process action (510) a request to add dependencies is issued. The relationship of the cursor to the execution representation metadata versions is expressed via dependencies.

Dependencies are realized via Dependency Structures and Dependency References. Each child has a Dependency Structure and each parent has a Dependency Reference. During process action (510) the pointer to the parent Dependency Reference is added to the child Dependency Structure and the pointer to the child Dependency Structure is added to the parent Dependency Reference. The lock is released on the execution representation metadata version in process action (512). The parse completes, and the lock is released on base metadata TB1 (514).

Versioning Infrastructure

In one embodiment, the versioning infrastructure includes a search and create process, an aging-out process, and dependency structures. In another embodiment the dependency structures are not included. The search and create process manages new and obsolete versions of metadata. The dependency structures provide a mechanism for a client or another object to declare interest in, or dependency on, a metadata object. The aging-out process deletes the obsolete metadata versions in the system when no longer needed (i.e., when dependencies no longer exist). In another embodiment, a viewing process allows the viewing of any and/or all active versions of a metadata.

Figure 6:
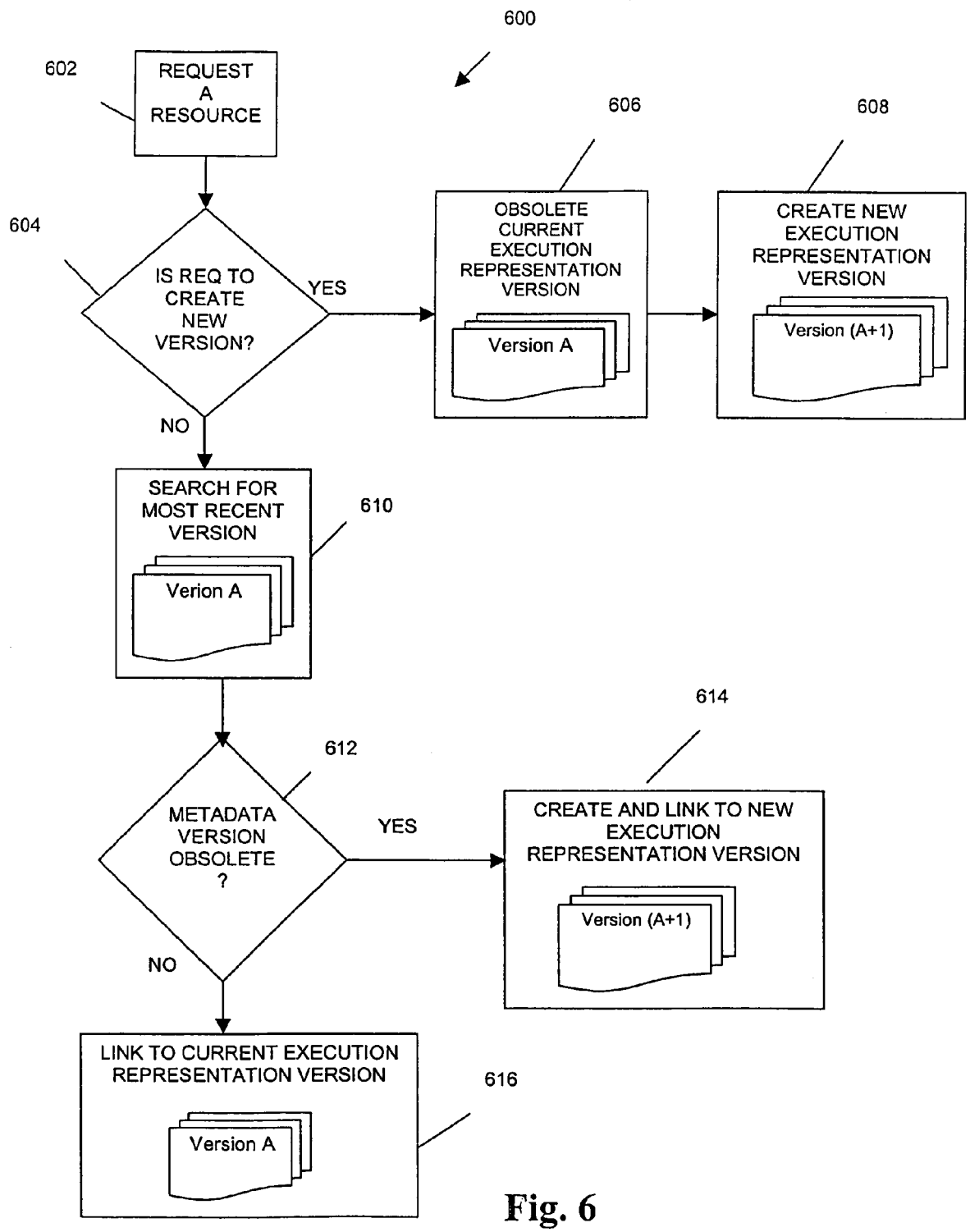
FIG. 6 is a representation of the search and create process.

FIG. 6 depicts a representation of the search and create process 600 according to one embodiment. For the purposes of this example, assume that two types of requests may be issued to access the data. A first type of access is to create a new version of the metadata (e.g., a write or update operation request). A second type of request will not create a new version of metadata (e.g., a read operation request). The request may identify a resource, or object, of the system to be operated upon. A request to access a resource occurs at process action (602). It is determined at process action (604) if the request is a request for a new version of the metadata, i.e., a write request. If the request is for a new version, the current version of the metadata is marked obsolete in process action (606), and a new execution representation version of metadata is created in process action (608). If it is determined at process action (604) that the request is not a request for a new version of the metadata, i.e., a read request, then a search (610) is conducted for the most recent execution representation version of the metadata. It is determined at process action (612) if the retrieved most recent metadata execution representation has been marked obsolete. If it is determined at process action (612) that the retrieved most recent metadata execution representation has been marked obsolete, then a new execution representation version of metadata is created and the program unit is linked to the new execution representation version at process action (614). If it is determined at (612) that the retrieved most recent execution representation metadata has not been marked obsolete, then it can be assumed that the most recent execution representation version of the metadata has been found, and the process then links the program unit to the current execution representation metadata version (616).

For example, suppose a request to create a new partition in a table was issued. Process action (604) would determine that the request was a request for a new version of metadata. The existing execution representation version of the table metadata would be marked obsolete in process action (606) and the new execution representation version of a table metadata based on the modified table is created in process action (608).

In another example, suppose a request to select data in a table was issued. Process action (604) would determine that the request was not a request for a new version of metadata. Process action (610) would search for and return the most recent execution representation version of the table metadata. If the metadata execution representation returned is not obsolete (612), then the curser is linked to the metadata execution representation, thereby sharing the metadata execution representation with any presently linked cursors.

In another scenario, the metadata execution representation returned in process action (610) is obsolete. This situation would occur if a previous create new execution representation version operation, such as that of process action (608), failed. Consequently, a new metadata execution representation version was never created but the previous version was already marked obsolete. In this case, process action (614) would then create a new metadata execution representation version and link the client cursor to it.

Figure 7:
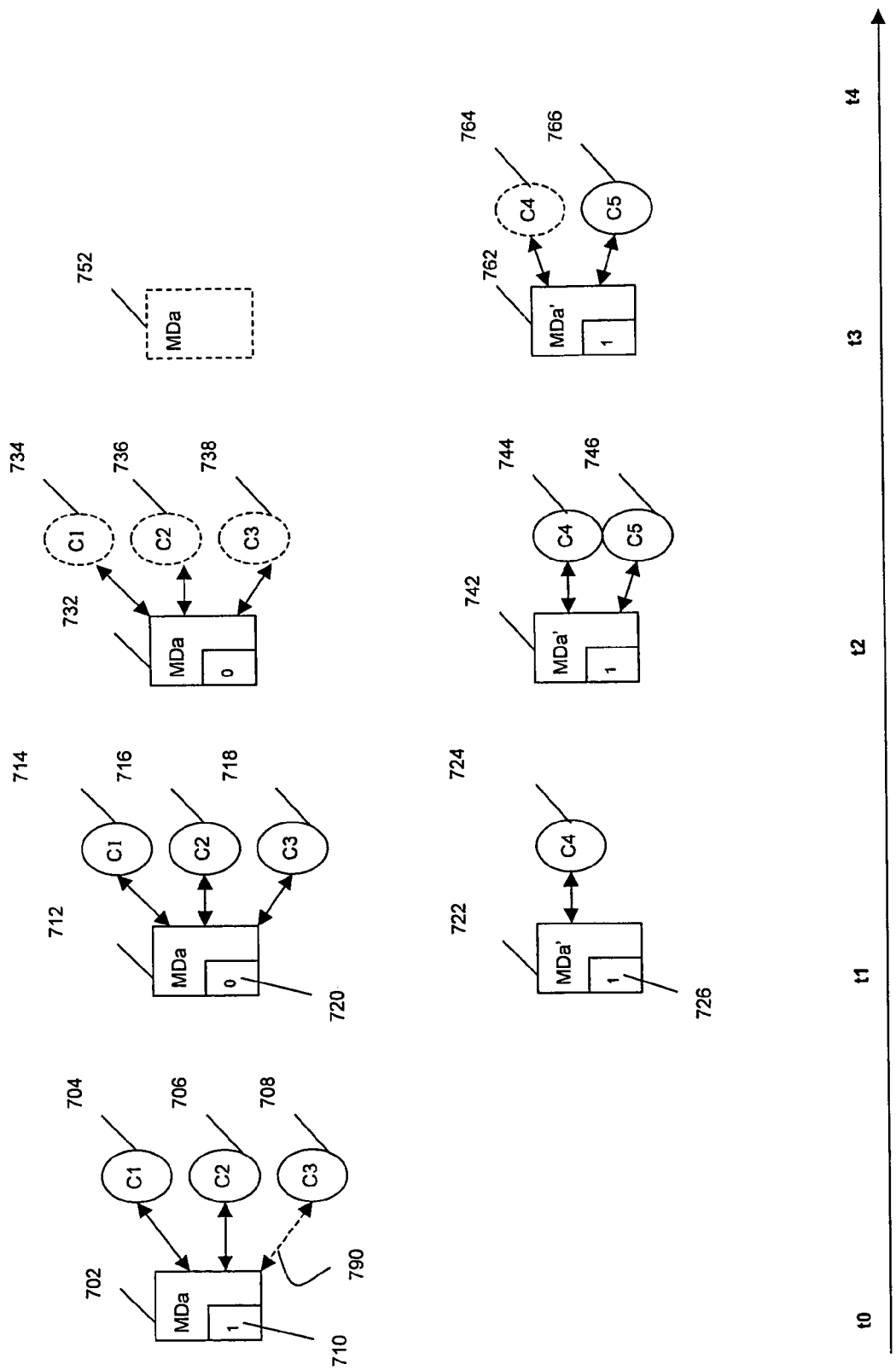
FIG. 7 is a representation of versioned metadata shared by cursors over time.

To further explain the versioning infrastructure FIG. 7 illustrates an embodiment of versioned metadata over time. The metadata is represented by rectangular structures labeled MDa such as metadata MDa at t0 702 and metadata MDa' at t1 722. Each Metadata structure has a "0" or "1" in an inset rectangle in the lower left corner. The inset rectangle represents the current version flag. A "1" in the current version flag indicates the metadata has not been marked obsolete. A "0" in the current version flag indicates that the metadata has been marked obsolete. The oval structures connected to the metadata by double arrow lines represent program units, such as cursors, linked to, or sharing, the metadata. Cursors shown with dashed lines indicate the cursor has completed its operation and become freeable. Program units or cursors removed from the drawing indicate the object has been freed. Program units or cursors added to the drawing over time indicate a new client request was issued and the resulting program unit was linked to the metadata. As mentioned previously, although cursors are shown as ovals, and metadata as rectangles, a cursor is an example of metadata, and therefore, may be shown as the same entity type. The double arrow lines indicate a parent/child relationship.

Figure 8:
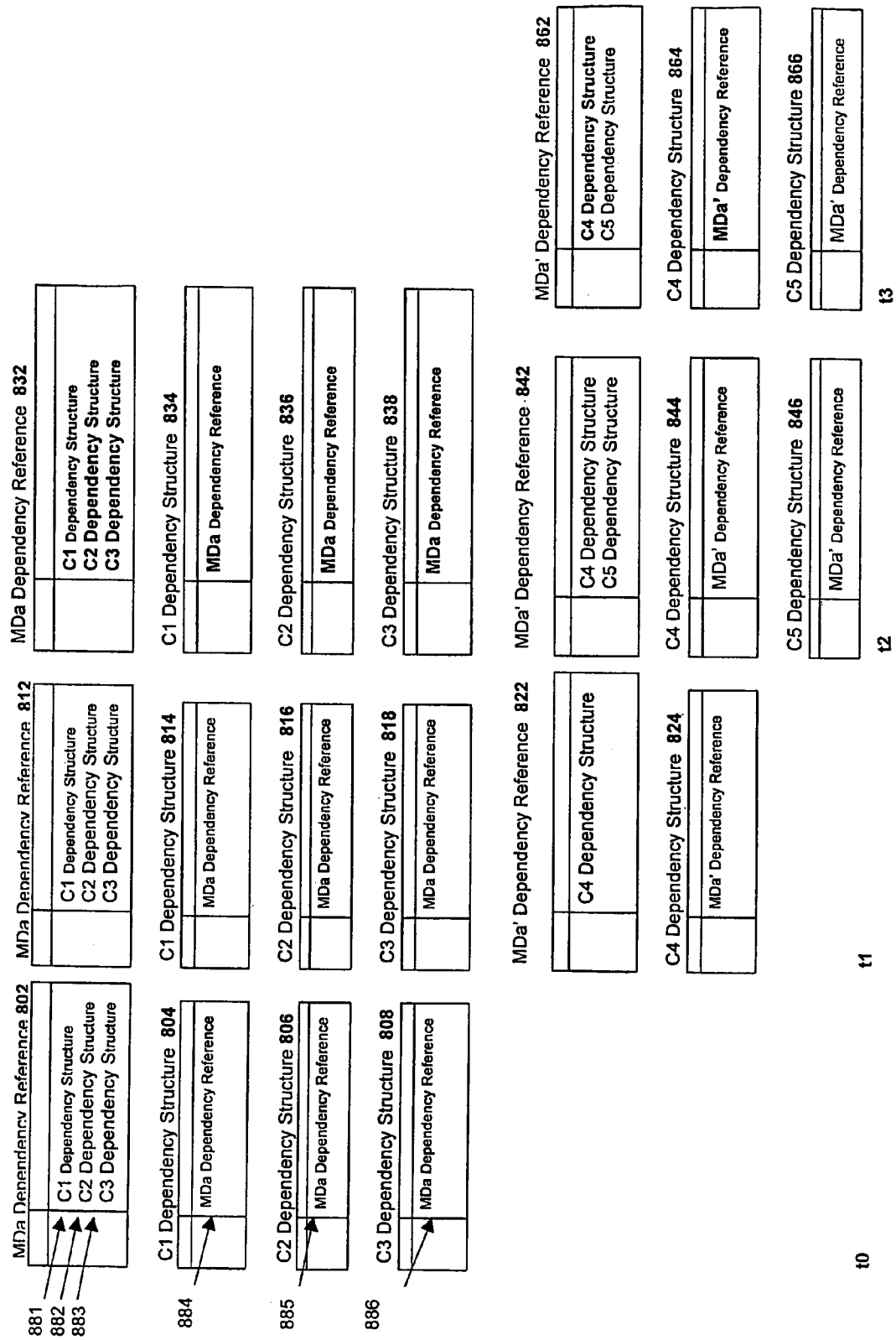
FIG. 8 is a representation of dependency structures over time.
Figure 9:
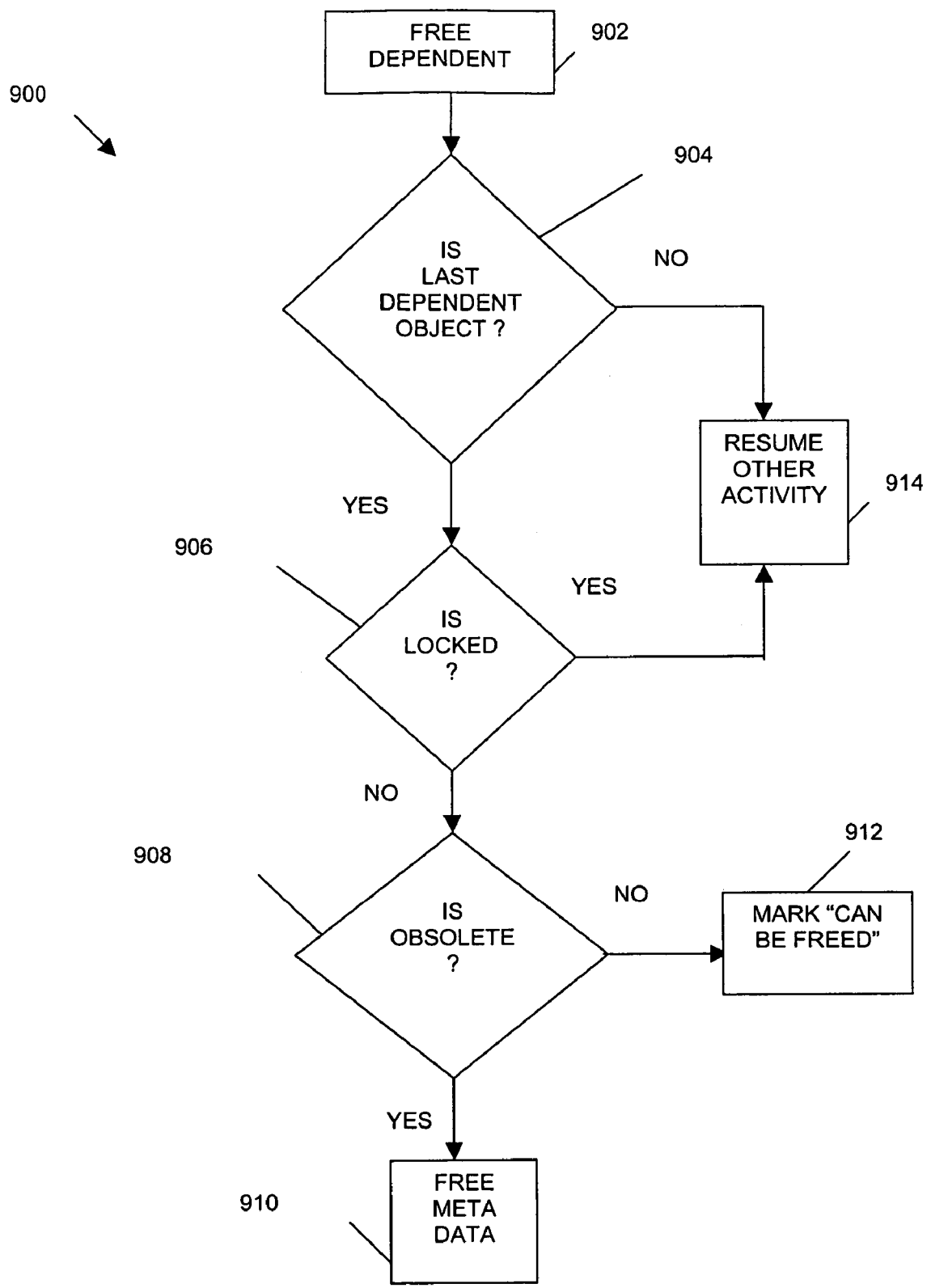
FIG. 9 is a representation of the aging-out process.

FIG. 8 is a representation of an embodiment of the dependency structures of versioned metadata over time. The dependency structures are data storage devices containing information regarding the relationship between parent objects and child objects and are used to determine when an obsolete metadata execution version can be deleted. The structures are represented in FIG. 8 by rectangular structures containing data fields. Each parent object stores dependency information in a Dependency Reference and each child object stores dependency information in a Dependency Structure. For example, each parent Dependency Reference contains a pointer to the child Dependency Structure of each child object with which it is linked. Each child Dependency Structure contains a pointer to the Dependency Reference of the parent with which it is linked. An object can be both a parent and a child, and can therefore have both a Dependency Reference and a Dependency Structure. This will become more clear as the figures are explained further.

FIG. 7 and FIG. 8 will be discussed in the following paragraphs in relation to the creation and linking process shown in FIG. 6.

At time t0, three clients have requested to access object "a". For each request the search and create process 600: searches (610) and finds metadata execution representation version MDa 702, determines that metadata MDa 702 is not obsolete (612) but is the current most recent metadata execution representation version indicated by the "1" in current version flag 710, and links the cursor to the metadata execution representation MDa 702. Child C1 704, C2 706, and C3 708 are shown linked to the current version of metadata execution representation, MDa 702, in representation FIG. 7. At this point there are three child objects, i.e., cursors C1 704, C2 706, and C3 708 currently accessing object "a", and sharing metadata MDa 702. If another read request came in at this time, its cursor would also share metadata MDa 702 as a result of the search and create process 600. The three cursors will have access to metadata MDa as long as they exist.

Also at time t0, the Dependency Reference for parent MDa 802 contains pointers 881, 882, and 883 to each of C1 Dependency Structure 804, C2 Dependency Structure 806, and the C3 Dependency Structure 808, respectively. Each of child dependency structures C1 Dependency Structure 804, C2 Dependency Structure 806, and C3 Dependency Structure 808 contain a pointer, 884, 885, and 886, respectively, to the MDa Dependency Reference 802 for parent object MDa.

At time t1, all three children C1 714, C2 716, and C3 718 remain linked to MDa 712. The MDa Dependency Reference at t1 812 and cursor Dependency Structures 814, 816, and 818 remain unchanged. However, a request for a new version of metadata, such as C4 724, was received in process action (604), i.e., a request to modify object "a". As a result, metadata execution representation MDa at time t1 712 is marked obsolete in process action (606) and a new metadata execution representation version MDa' 722 is created in process action (608). Current version flag 720 contains a "0" showing that metadata execution representation MDa 712 is obsolete and is no longer the current, i.e., most recent, metadata execution representation version. Metadata execution representation version MDa' 722 is shown at time t1 in FIG. 7 with a "1" in current version flag 726, indicating that metadata execution representation MDa' 722 is not obsolete but is the current, most recent, metadata execution representation version. Since metadata execution representation MDa' 722 is the most recent not obsolete metadata execution representation version, cursor C4 724 is linked to (i.e., shares) it. Along with a new metadata and cursor, also created are parent MDa' Dependency Reference 822 containing the pointer to the child C4 Dependency Structure 824 and C4 Dependency Structure 824 containing the pointer to the MDa' Dependency Reference 822.

At this point there is a current metadata execution representation version MDa' 722 and an obsolete metadata execution representation version MDa 712. Cursors C1 714, C2 714 and C3 718 will maintain access to the obsolete metadata execution representation version 712 as long as they exist. Cursor C4 724 will maintain access to the current metadata 722 as long as it exists. No new requests will obtain access to the obsolete metadata 712. All new read requests received will be linked to metadata execution representation MDa' 722 by the search and create process 600. Multiple versions of metadata can be created in this environment. Each one would be maintained while needed. In another embodiment, cursors C1, C2, and C3 can have other objects linked to them while they are linked to metadata execution representation MDa.

At time t2, cursors C1 734, C2 736, and C3 738 are finished executing and can be removed from the system. New cursors will not be linked to metadata execution representation MDa 732 because MDa 732 is not the current metadata execution representation version, as it is marked obsolete. When an object having no dependents is no longer in use, it is marked freeable. As such, each cursor is marked freeable as indicated in FIG. 7 by the dashed structures of C1 734, C2 736 and C3 738, and as indicated in FIG. 8 by bold pointers in Dependency Structures 834, 836, and 838 and in metadata MDa Dependency Reference 832.

FIG. 7 at time t2 also depicts that a request for a resource occurred in search and create process 600 process action (602) that was not a request for a new version (604). The resulting child cursor, C5 746 was linked to and shared metadata execution representation version MDa' 742 in process action (616) because execution representation MDa' 742 was found to be the most recent metadata execution representation version (610) that was not obsolete (612). Execution representation MDa' 742 shows cursor C4 744 remains linked and new cursor C5 746 is linked. As such, parent Mda' Dependency Reference at t2 842 contains pointers for the child cursor C4 Dependency Structure 844, and the new child cursor C5 Dependency Structure 846. Each of child C4 Dependency Structure 844 and child C5 Dependency Structure 846 contain a pointer for the parent object MDa' Dependency Reference 842.

At this point metadata execution representation version Mda' 742, the most recent metadata version, is not obsolete and has two active dependents, C4 744 and C5 746. Metadata execution representation version Mda 732 is obsolete and has no active dependents. There are three freeable dependents, cursors C1 734, C2 736, and C3 738, which will trigger the aging-out process 900 described further below.

At time t3, execution representation version MDa' 762 is shown as the current metadata version with cursor C5 764 linked. The child CS Dependency Structure 866 contains the pointer for the MDa' Dependency Reference 862. The parent MDa' Dependency Reference 862 contains the pointer for the child C5 Dependency Structure 866. Cursor C4 is no longer executing and is marked freeable, shown by the dashed oval in FIG. 7 and the bold pointer to MDa Dependency Reference in the C4 Dependency Structure 864 and the bold pointer to the C4 Dependency Structure in the MDa Dependency Reference 862. Children C1, C2, and C3 have been freed as indicated by the removal of them from the drawing. As such, the C1, C2, and C3, memory can be reallocated as needed. Methods for handling freed metadata resources are performed by the resource allocation subsystem and are known in the art. Also at time t3, MDa 752 also becomes freeable as it has no dependents since C1, C2 and C3 have been freed. This is indicated by the dashed structure.

As mentioned previously dependency structures are used to track the relationship between parent and child objects. A Dependency Reference is used by each parent to track each child dependent, and a child Dependency Structure is used by each child to track each parent on which it depends. The pointers in the dependent structures indicate interest or dependency. Each version of the metadata remains in the system while any client is interested in it or dependent on it. That is, dependency structures are used like a locking mechanism. An object is aged out only when it has no dependents and the memory it occupies is needed.

At time t2, cursors C1, C2 and C3 become freeable dependents. In this example, assume they become freeable dependents in numerical order. The first one to become a freeable dependent, C1, will trigger the metadata aging-out process 900 at process action (902). The process determines if the freeable dependent is the last dependent of the metadata in process action (904). Since there are three cursors with a dependency on metadata execution representation version MDa, the first two times through process action (904), (for cursors C1 and C2) it is determined that they are not the last dependents, and the system will resume other activities (914). When cursor C3, the third and final cursor, is marked freeable and goes though the metadata aging-out process 900, process action (904) determines that it is the last dependent. Process action (906) determines if the metadata execution representation version is locked by any other object. If the metadata execution representation version is locked, the system will resume other processing activities (914). In this example the metadata execution representation version is not locked by another object. Process action (908) determines if the metadata execution representation is obsolete. If it is not obsolete the metadata execution representation is marked "can be freed" in process action (912). Another client may request a resource and still be linked to a metadata execution representation that is marked "can be freed" because the metadata execution representation is still the most recent metadata version that has not been marked obsolete. In this instance, metadata execution representation version MDa is obsolete, and is freed in process action (910). Methods for handling freed metadata resources are performed by the resource allocation subsystem and are known in the art.

In another embodiment, a viewing mechanism provides a client a way to view of all metadata execution representation versions, obsolete or not.

Further details about versioned metadata is available in related U.S. patent application 60/571,361 filed May 14, 2004 entitled "System for Managing Transient Versions of Cached Metadata" which is fully incorporated as if set forth herein.

System Architecture Overview

Figure 10:
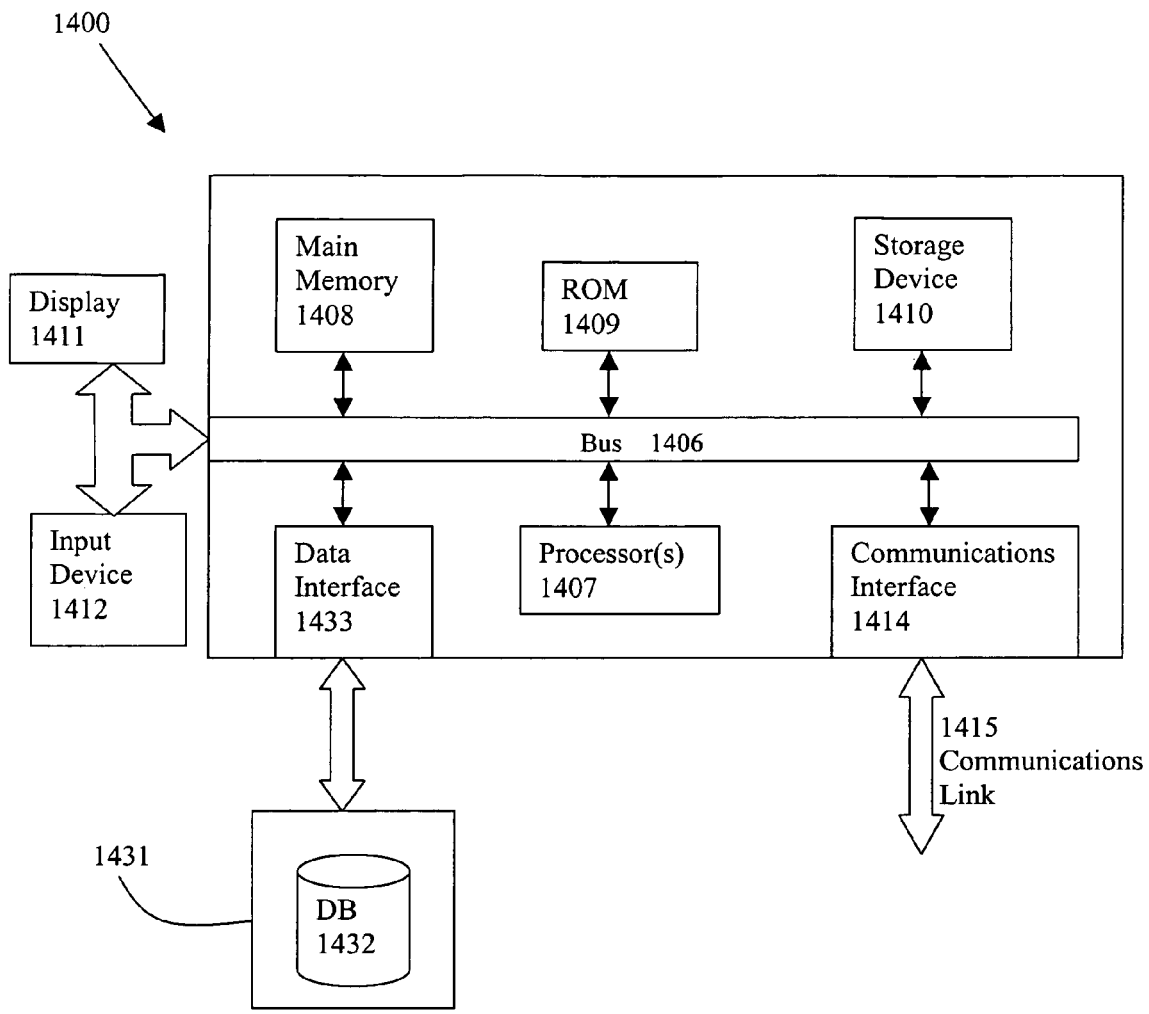
FIG. 10 is a representation of a system in which metadata sharing takes place.

The execution of the sequences of instructions required to practice the embodiments may be performed by a computer system 1400 as shown in FIG. 10. In an embodim to practice the invention is performed by a single computer system 1400. According to other embodiments of the invention, two or more computer systems 1400 coupled by a communication link 1415 may perform the sequence of instructions required in coordination with one another. In order to avoid needlessly obscuring the embodiments, a description of only one computer system 1400 will be presented below; however, it should be understood that any number of computer systems 1400 may be employed.

A computer system 1400 according to an embodiment will now be described with reference to FIG. 10, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be the internet in which case the communication interface 1414 may be a telephone line, a cable or a wireless modem, or the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In some embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software. Logic refers to hardware, software or any combination of hardware and software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

The foregoing specification has been described with reference to specific embodiments. It will, however, be evident that various modifications and changes may be made thereto without departing from the broader spirit and scope. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A method of sharing metadata, at least part of the method implemented using a processor, the method comprising:
   receiving a plurality of requests to access a resource;
   creating a program unit for each of the plurality of requests;
   creating an execution representation of metadata for the resource using the processor, wherein the metadata comprises partitioning information for the resource, and the execution representation of the metadata allows sharing of the metadata without storing multiple copies of instances of the metadata; and
   sharing the execution representation of the metadata among the plurality of program units.

2. The method of claim 1, wherein the metadata for the resource is a versioned object.

3. The method of claim 2, wherein creating the execution representation comprises:
   creating a plurality of execution representation versions of the resource's metadata, the plurality of program units having access to the plurality of execution representation version without storing the metadata in the memory of each program unit.

4. The method of claim 3, wherein sharing the execution representation comprises:

establishing each of the plurality of program units as dependents of the execution representation version.

5. The method of claim 4, wherein each of the plurality of execution representation versions is maintained while it is in use or while it has a dependent.

6. The method of claim 5, wherein each of the execution representation versions of metadata is eliminated when no longer in use and when it no longer has dependents.

7. The method of claim 1, wherein creating the execution representation comprises:
accessing a persistent version of the resource's metadata;
locking the persistent version;
creating an execution representation version of the resource's metadata; and
unlocking the persistent version.

8. A system of sharing metadata, comprising:
means for receiving a plurality of requests to access a resource;
means for creating a program unit for each of the plurality of requests;
means for creating an execution representation of metadata for the resource on a volatile or non-volatile computer readable medium, wherein the metadata comprises partitioning information for the resource, and the execution representation of the metadata allows sharing of the metadata without storing multiple copies of instances of the metadata; and
means for sharing the execution representation of the metadata among the plurality of program units.

9. The system of claim 8, wherein the metadata for the resource is a versioned object.

10. The system of claim 9, wherein the means for creating the execution representation comprises:
means for creating a plurality of execution representation versions of the resource's metadata object, the plurality of program units having access to the plurality of execution representation version without storing the metadata object in the memory of each program unit.

11. The system of claim 10, wherein the means for sharing the execution representation comprises:
means for establishing each of the plurality of program units as dependents of the execution representation version.

12. The system of claim 11, wherein each of the plurality of execution representation versions is maintained while it is in use or while it has a dependent.

13. The system of claim 12, wherein each of the execution representation versions of metadata is eliminated when no longer in use and when it no longer has dependents.

14. The system of claim 8, wherein the means for creating the execution representation comprises:
means for accessing a persistent version of the resource's metadata;
means for locking the persistent version;
means for creating an execution representation version of the resource's metadata; and
means for unlocking the persistent version.

15. A computer program product embodied on a volatile or non-volatile computer readable medium, the computer readable medium having stored thereon a sequence of instructions which, when executed by a processor, causes the processor to execute a method for sharing metadata, the method comprising:
receiving a plurality of requests to access a resource;
creating a program unit for each of the plurality of requests;
creating an execution representation of metadata for the resource, wherein the metadata comprises partitioning information for the resource, and the execution representation of the metadata allows sharing of the metadata without storing multiple copies of instances of the metadata; and
sharing the execution representation of the metadata among the plurality of program units.

16. The computer program product of claim 15, wherein the metadata for the resource is a versioned object.

17. The computer program product of claim 16, wherein creating the execution representation comprises:
creating a plurality of execution representation versions of the resource's metadata, the plurality of program units having access to the plurality of execution representation version without storing the metadata object in the memory of each program unit.

18. The computer program product of claim 17, wherein sharing the execution representation comprises:
establishing each of the plurality of program units as dependents of the execution representation version.

19. The computer program product of claim 18, wherein each of the plurality of execution representation versions is maintained while it is in use or while it has a dependent.

20. The computer program product of claim 19, wherein each of the execution representation versions of metadata is eliminated when no longer in use and when it no longer has dependents.

21. The computer program product of claim 15, wherein creating the execution representation comprises:
accessing a persistent version of the resource's metadata;
locking the persistent version;
creating an execution representation version of the resource's metadata; and
unlocking the persistent version.

* * * * *

UNITED STATES PATENT AND TRADEMARK OFFICE
CERTIFICATE OF CORRECTION

| | | |
|---|---|---|
| PATENT NO. | : 7,698,310 B2 | Page 1 of 1 |
| APPLICATION NO. | : 11/129617 | |
| DATED | : April 13, 2010 | |
| INVENTOR(S) | : Subhransu Basu et al. | |

It is certified that error appears in the above-identified patent and that said Letters Patent is hereby corrected as shown below:

On sheet 6 of 10, in Figure 6, line 4, box "610" delete "Verion" and insert -- Version --, therefor.

In column 7, line 56, delete "CS" and insert -- C5 --, therefor.

In column 8, line 58, delete "embodim" and insert -- embodiment --, therefor.

In column 11, line 35, in claim 10, delete "metadata object," and insert -- metadata, --, therefor.

In column 11, line 38, in claim 10, before "in" delete "object".

In column 12, line 30, in claim 17, after "metadata" delete "object".

Signed and Sealed this
Nineteenth Day of April, 2011

David J. Kappos
*Director of the United States Patent and Trademark Office*